(12) United States Patent
Shen

(10) Patent No.: US 9,367,105 B1
(45) Date of Patent: Jun. 14, 2016

(54) HEAT DISSIPATION STRUCTURE FOR WEARABLE MOBILE DEVICE

(71) Applicant: ASIA VITAL COMPONENTS CO., LTD., New Taipei (TW)

(72) Inventor: Ching-Hang Shen, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 0 days.

(21) Appl. No.: 14/555,706

(22) Filed: Nov. 28, 2014

(51) Int. Cl.
 *G06F 1/20* (2006.01)
 *G06F 1/16* (2006.01)
 *H05K 7/20* (2006.01)

(52) U.S. Cl.
 CPC ............. *G06F 1/203* (2013.01); *G06F 1/163* (2013.01)

(58) Field of Classification Search
 CPC .......... H05K 7/20; H05K 7/2039; G06F 1/20; G06F 1/16; G06F 1/163; F28D 15/04; F28D 15/046; H04M 1/00; H04M 1/02; A41D 13/005; A44C 5/0023
 USPC .......... 361/75–712, 714, 715, 719; 165/80.2–80.5, 104.21, 104.26, 165/104.33, 104.34, 185; 607/104, 108, 607/114; 62/3.5, 259.2
 See application file for complete search history.

(56) References Cited

U.S. PATENT DOCUMENTS

| 6,282,089 | B1 * | 8/2001 | Nakanishi | G06F 1/163 361/679.47 |
| 6,556,444 | B2 * | 4/2003 | Smith | D03D 15/00 165/80.3 |
| 6,772,445 | B2 * | 8/2004 | Yeager | A44C 5/0023 2/170 |
| 8,099,794 | B2 * | 1/2012 | Carstens | G06F 1/163 2/16 |
| 9,132,031 | B2 * | 9/2015 | Levinson | A61F 7/10 |
| 2002/0186535 | A1 * | 12/2002 | Smith | D03D 15/00 361/704 |
| 2007/0106350 | A1 * | 5/2007 | Carstens | A41D 13/005 607/108 |
| 2010/0155032 | A1 * | 6/2010 | Wu | F28D 15/046 165/104.26 |
| 2015/0029661 | A1 * | 1/2015 | Huang | G06F 1/203 361/679.54 |
| 2015/0241915 | A1 * | 8/2015 | Goyal | G06F 1/16 361/679.03 |
| 2015/0359135 | A1 * | 12/2015 | Cavallaro | H05K 7/2039 361/679.03 |

FOREIGN PATENT DOCUMENTS

CN           201910165 U  *  7/2011  ............. G09B 19/06

* cited by examiner

*Primary Examiner* — Michail V Datskovskiy
(74) *Attorney, Agent, or Firm* — C. G. Mersereau; Nikolai & Mersereau, P.A.

(57) ABSTRACT

A heat dissipation structure for a wearable mobile device comprises a wearable mobile device and a flexible belt. The wearable mobile device has a receiving space which receives a plurality of electronic components having at least one heat source. The flexible belt is made of rubber or silicone and has a cavity which has at least one wick structure and a working liquid. A wall of the cavity protrudes to form a supporting portion. The flexible belt defines a heat absorbing portion and at least one heat dissipating portion. Two ends of the heat absorbing portion form the heat dissipating portion. The heat absorbing portion contacts the electronic components or the heat source to conduct heat. The present invention provides a heat dissipation structure using a vapor-liquid circulating chamber and structure disposed in a flexible belt for a wearable mobile device to enhance the whole heat dissipation efficiency.

9 Claims, 9 Drawing Sheets

HEAT DISSIPATION STRUCTURE FOR WEARABLE MOBILE DEVICE

BACKGROUND OF THE INVENTION

1. Field of the Invention

The present invention relates to a heat dissipation structure for a wearable mobile device and, in particular, to a heat dissipation structure for a wearable mobile device which is used to dissipate heat inside the wearable mobile device.

2. Description of Prior Art

As technology increasingly advances, the current wearable mobile devices are not limited to mobile phones and tablet computers, but further cover wearable devices such as watches, necklaces, and rings which become multiple function smart mobile devices. Besides, per customers request, the electronic components associated with the touch panel, GPS function, exercise sensors, and medical monitoring function are integrated into the smart mobile devices. For the smart watch, it not only can connect with other mobile devices through the Bluetooth or the network, but also can have the network capability after a 3G or 4G SIM card inserted and perform the functions of calling, photographing, and video recording. Thus, when the smart watch is operating, it will generate heat. Also, the whole structure of the smart watch is designed as sealed to be dustproof, waterproof, or protected. As a result, the heat generated by the internal electronic elements cannot be dissipated to the outside and accumulated inside the smart watch or the device, which causes the smart watch to operate inefficiently or pause and more serious to crash. Therefore, how to dissipate the heat generated by the smart watch or various wearable exercise devices becomes a priority issue to be resolved.

SUMMARY OF THE INVENTION

Thus, to overcome the disadvantages of the above issue, the primary objective of the present invention is to provide a heat dissipation structure for a wearable mobile device, which resolves the issue of internal heat accumulation of the wearable mobile device.

To achieve the above objective, the present invention provides a heat dissipation structure for a wearable mobile device, which comprises a wearable mobile device and a flexible belt. The wearable mobile device has a receiving space which receives a plurality of electronic components. The electronic components have at least one heat source. The flexible belt is made of rubber or silicone; the flexible belt has a cavity which is configured with a working liquid and a wick structure. A wall of the cavity protrudes to form a supporting portion. The flexible belt defines a heat absorbing portion and at least one heat dissipating portion. Two ends of the heat absorbing portion form the heat dissipating portion. The heat absorbing portion contacts the electronic components or the heat source to conduct heat. The present invention provides a heat dissipation structure using a vapor-liquid circulating chamber and structure disposed in a flexible belt for a wearable mobile device to enhance the whole heat dissipation efficiency.

DETAILED DESCRIPTION OF THE INVENTION

The above objective of the present invention and the features of structure and function of the present invention are described according to preferred embodiments in accompanying figures.

Figure 1:
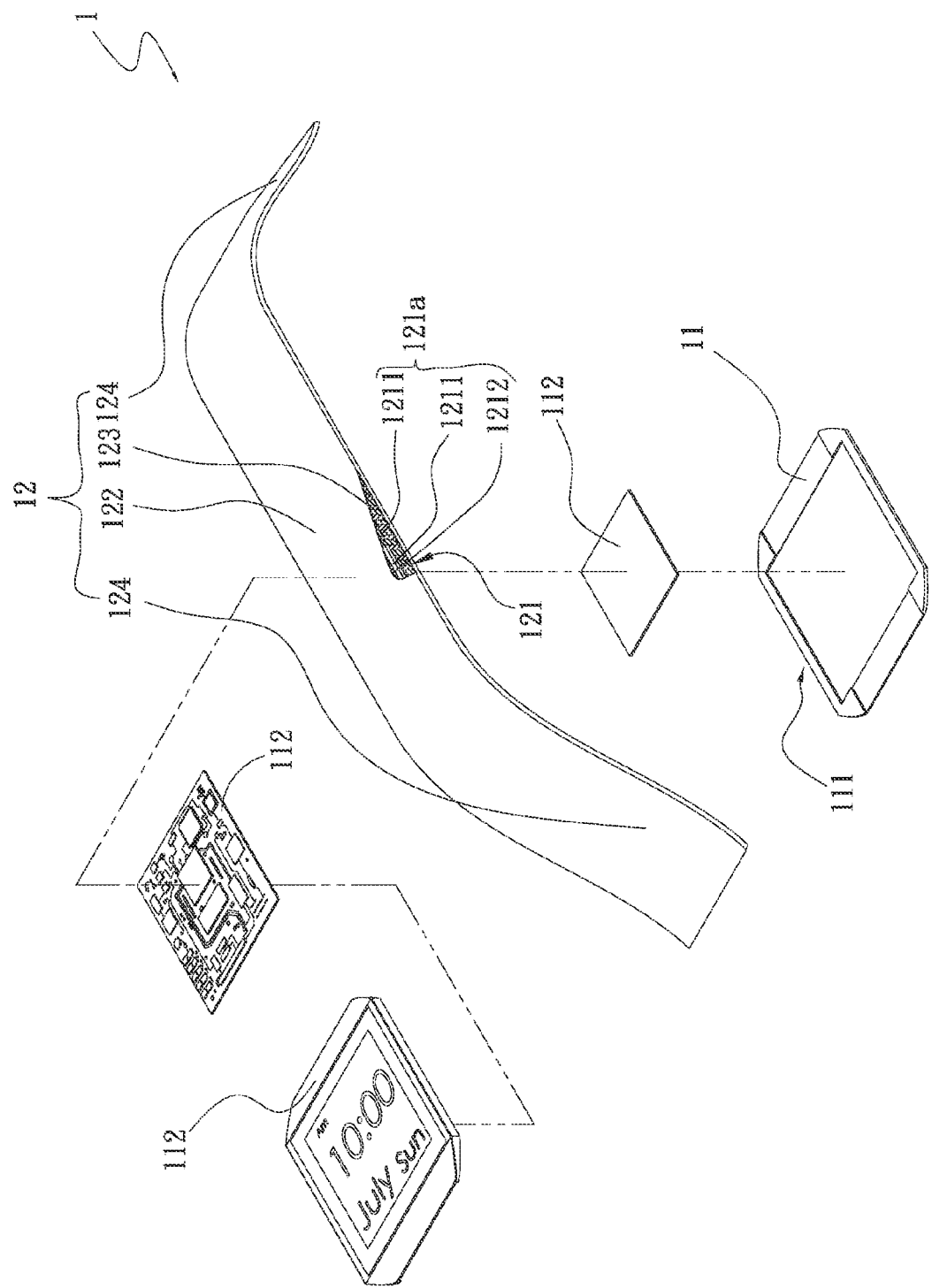
FIG. 1 is a perspective exploded view of the heat dissipation structure for a wearable mobile device according to the first embodiment of the present invention.
Figure 2:
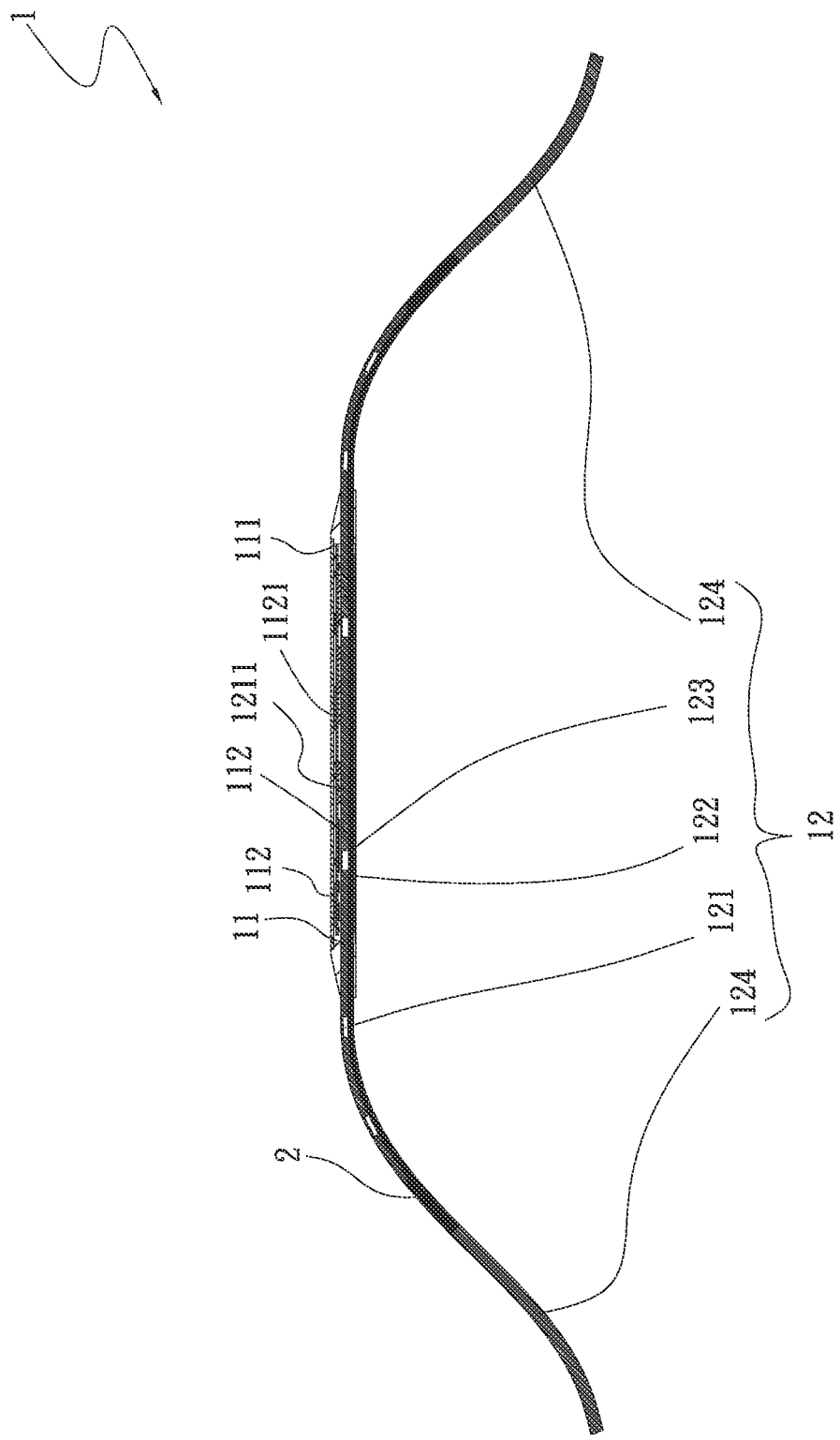
FIG. 2 is an assembled cross-sectional view of the heat dissipation structure for a wearable mobile device according to the first embodiment of the present invention.
Figure 3:
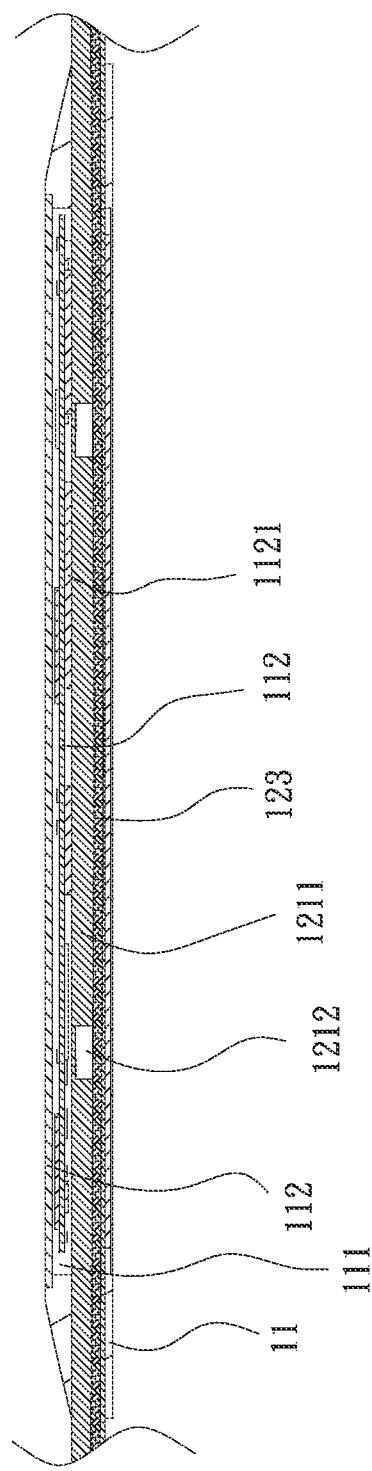
FIG. 3 is a local enlarged view of FIG. 2.

Please refer to FIGS. 1-3, which are a perspective exploded view, an assembled cross-sectional view, and a local enlarged view of the heat dissipation structure for a wearable mobile device according to the first embodiment of the present invention, respectively. As shown in FIGS. 1-3, the heat dissipation structure for a wearable mobile device 1 of the present invention comprises a wearable mobile device 11 and a flexible belt 12.

The wearable mobile device 11 has a receiving space 111 which receives a plurality of electronic components 112. The electronic components 112 have at least one heat source 1121.

The flexible belt 12 is made of rubber or silicone. The flexible belt 12 has a cavity 121 which is provided with at least one wick structure 123 and a working liquid 2. A wall of the cavity 121 protrudes to form a supporting portion 121a.

The supporting portion 121a has a plurality of ribs 1211 which are arranged continuously or non-continuously and are disposed in parallel. At least one channel 1212 is disposed among the ribs 1211. The channel 1212 can be used as a vapor channel to vaporize the working liquid 2.

The flexible belt 12 defines a heat absorbing portion 122 and at least one heat dissipating portion 124. At least one end of the heat absorbing portion 122 forms the heat dissipating portion 124.

The heat absorbing portion 122 is disposed in the receiving space 111 of the wearable mobile device 11 to contact the electronic components 112 or the heat source 1121.

In the current embodiment, the electronic components 112 are selected to be one of PCBs, transistors, CPUs, MCUs, displays, touch panels, and batteries. The electronic components 112 is attached on or placed on the heat absorbing portion 122 which is disposes close to the center of the flexible belt 12. The upper side or lower side of the heat absorbing portion 122 can directly contact the electronic components 112 (as shown in FIG. 2).

The heat absorbing portion 122 of the flexible belt 12 is thinner than the other portion of the flexible belt 12. Through the direct contact between the heat absorbing portion 122 and the electronic components 112 or the heat source 1121, the heat can be directly conducted from the heat absorbing portion 122 to the flexible belt 12 and can vaporize and diffuse the working liquid 2 in the cavity 121 of the flexible belt 12. Besides, condensation occurs in the cavity 121 located at the heat dissipation portion 124 of the flexible belt 12 and then the condensed liquid flows back to around the heat absorbing portion 122 through the wick structure 123 to repeat the vapor-liquid circulation to achieve the effect of heat dissipation.

Figure 4:
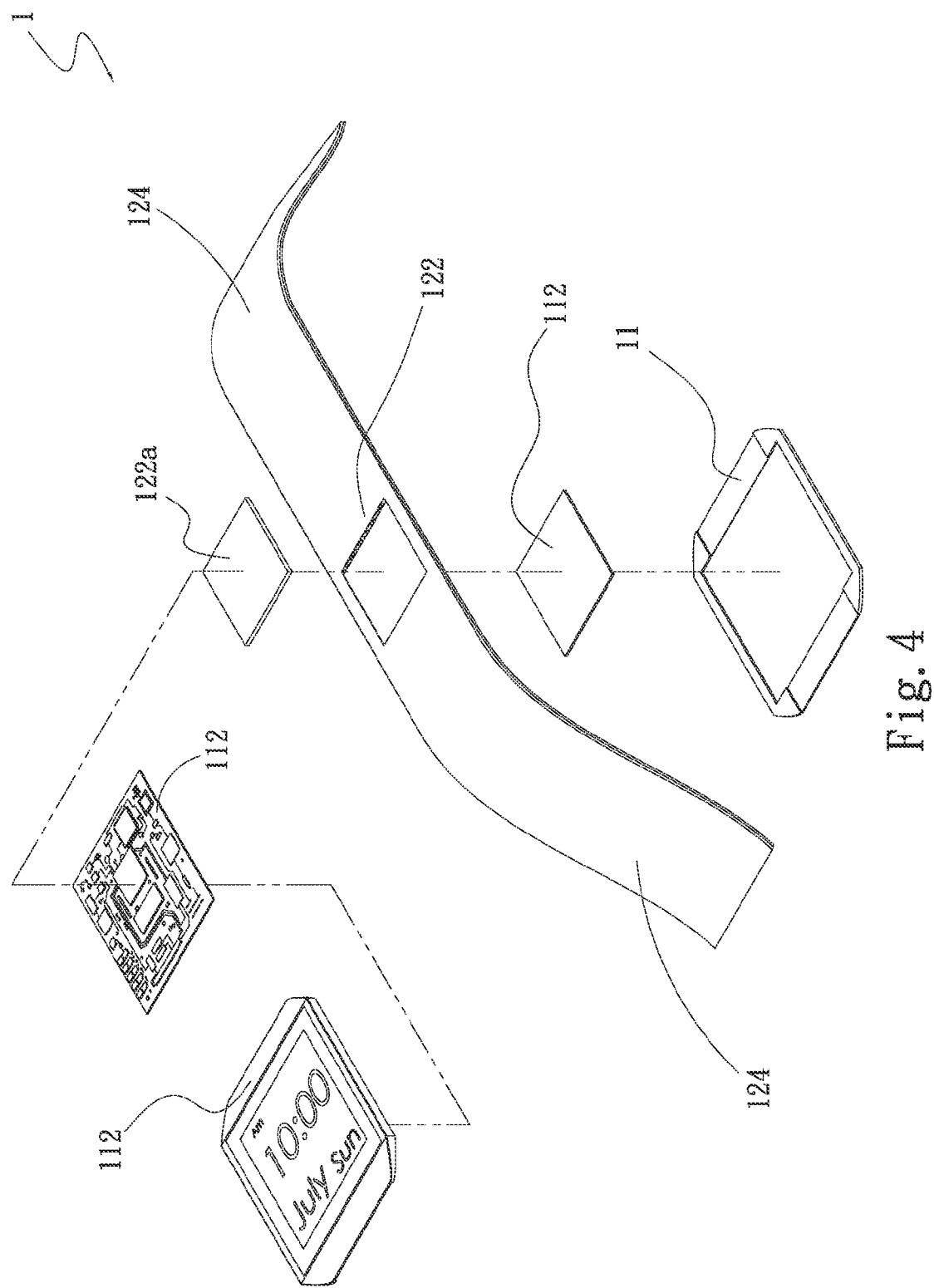
FIG. 4 is a perspective exploded view of the heat dissipation structure for a wearable mobile device according to the second embodiment of the present invention.
Figure 5:
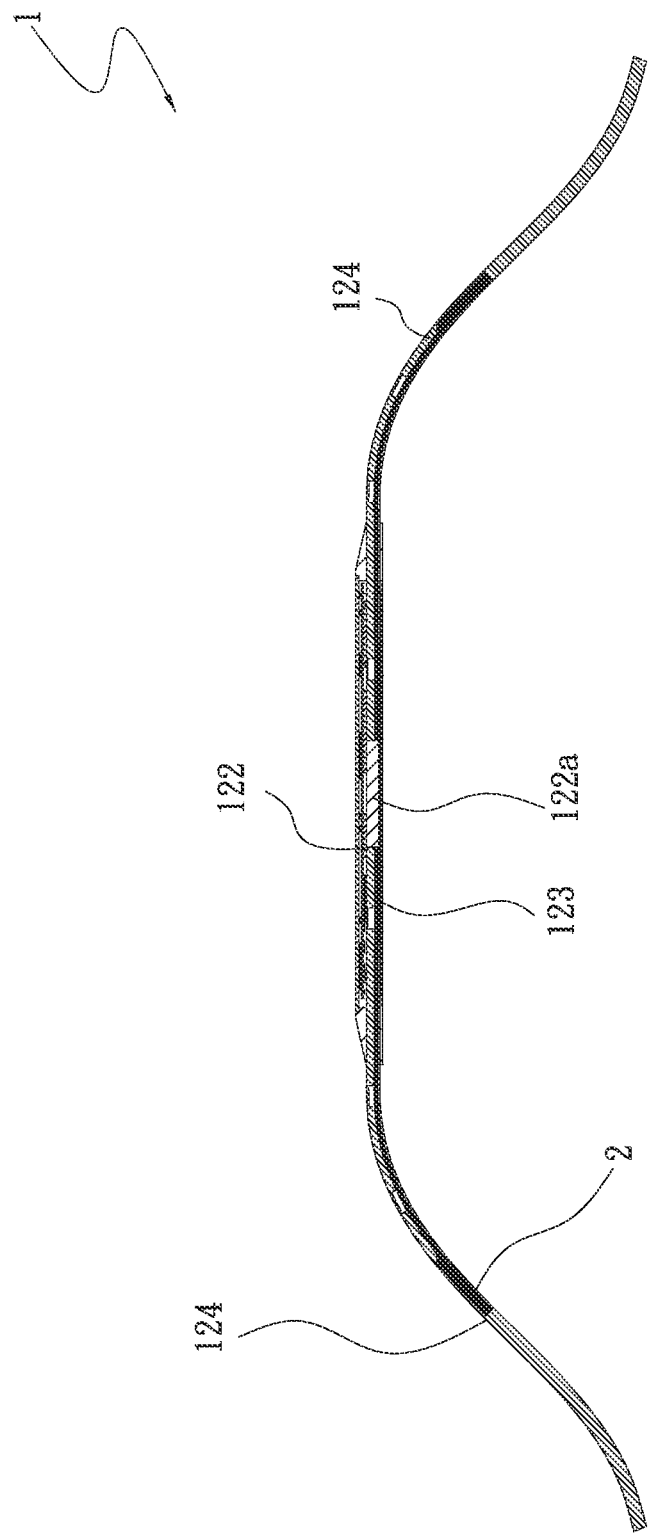
FIG. 5 is an assembled cross-sectional view of the heat dissipation structure for a wearable mobile device according to the second embodiment of the present invention.
Figure 6:
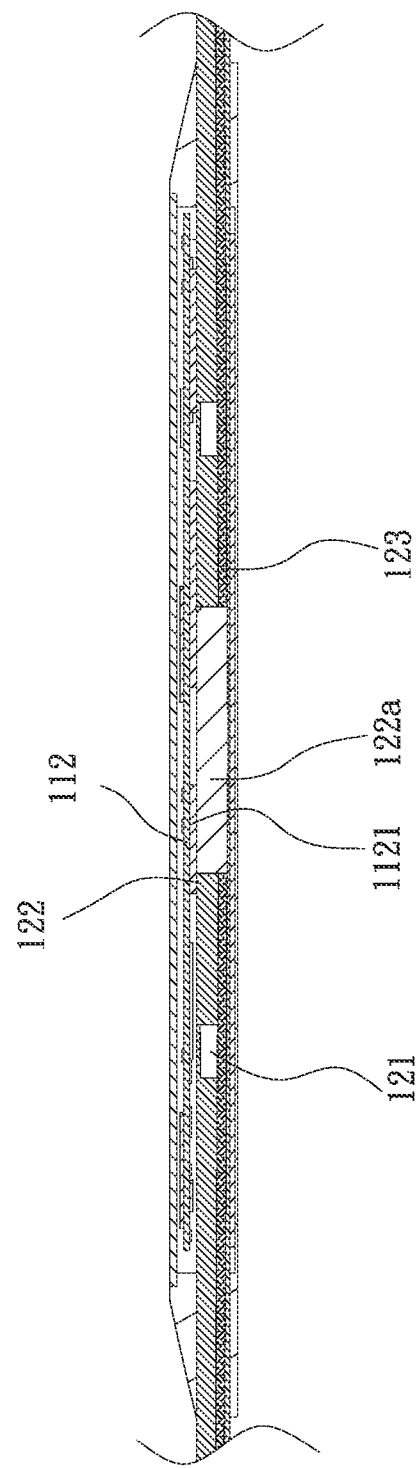
FIG. 6 is a local enlarged view of FIG. 5.

Please refer to FIGS. 4-6, which are a perspective exploded view, an assembled cross-sectional view, and a local enlarged view of the heat dissipation structure for a wearable mobile device according to the second embodiment of the present invention, respectively. Some structural and technical features of the current embodiment are the same as those of the first embodiment and will not be described here again. The difference is given below for the current embodiment. A heat conductor 122a is embedded in the heat absorbing portion 122. One side of the heat conductor 122a is attached to the electronic components 112 or the heat source 1121; the other side of the heat conductor 122a corresponds to the cavity 121 of the flexible belt 12. The wick structure 123 is partially extended and disposed around the heat conductor 122a.

In the current embodiment, the heat conductor 122a may be selected to be one of a copper plate, an aluminum plate, a metal plate, a heat pipe, a vapor chamber, and a graphite. The copper plate is used as an example in the current embodiment, but not limited to this.

The current embodiment is mainly to deal with the heat generated by the heat source 1121 of the electronic components 112 of the wearable mobile device 11. The heat is further absorbed through the heat conductor 122a disposed on the heat absorbing portion 122 and conducted into the cavity 121. The working liquid 2 in the cavity 121 of the heat absorbing portion 122 is heated and vaporized. Vaporization and diffusion occur in the cavity 121 of the heat absorbing portion 122. Then, the vapor is condensed to be a liquid state in the cavity 121 of the heat dissipating portion 124 and then is absorbed by the wick structure 123 to flow back to around the heat absorbing portion 122 to repeat the vapor-liquid circulation to achieve the effect of heat dissipation of the electronic components 112.

Figure 7:
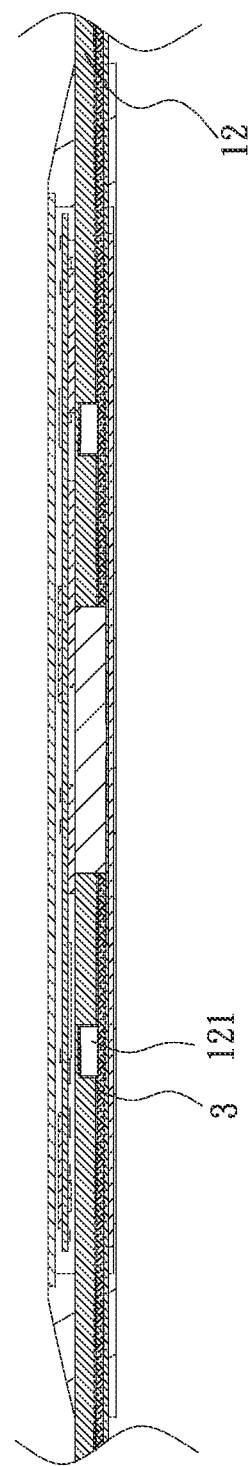
FIG. 7 is an assembled cross-sectional view of the heat dissipation structure for a wearable mobile device according to the third embodiment of the present invention.

Please refer to FIG. 7, which is an assembled cross-sectional view of the heat dissipation structure for a wearable mobile device according to the third embodiment of the present invention. As shown in FIG. 7, some structural and technical features of the current embodiment are the same as those of the second embodiment and will not be described here again. The difference is that the cavity 121 of the flexible belt 12 of the current embodiment further has a coating layer 3. The coating layer 3 is disposed on the wall of the cavity 121. The coating layer 3 can improve the condensation of the working liquid 2 (refer to FIG. 5) and the efficiency of liquid collection.

Figure 8:
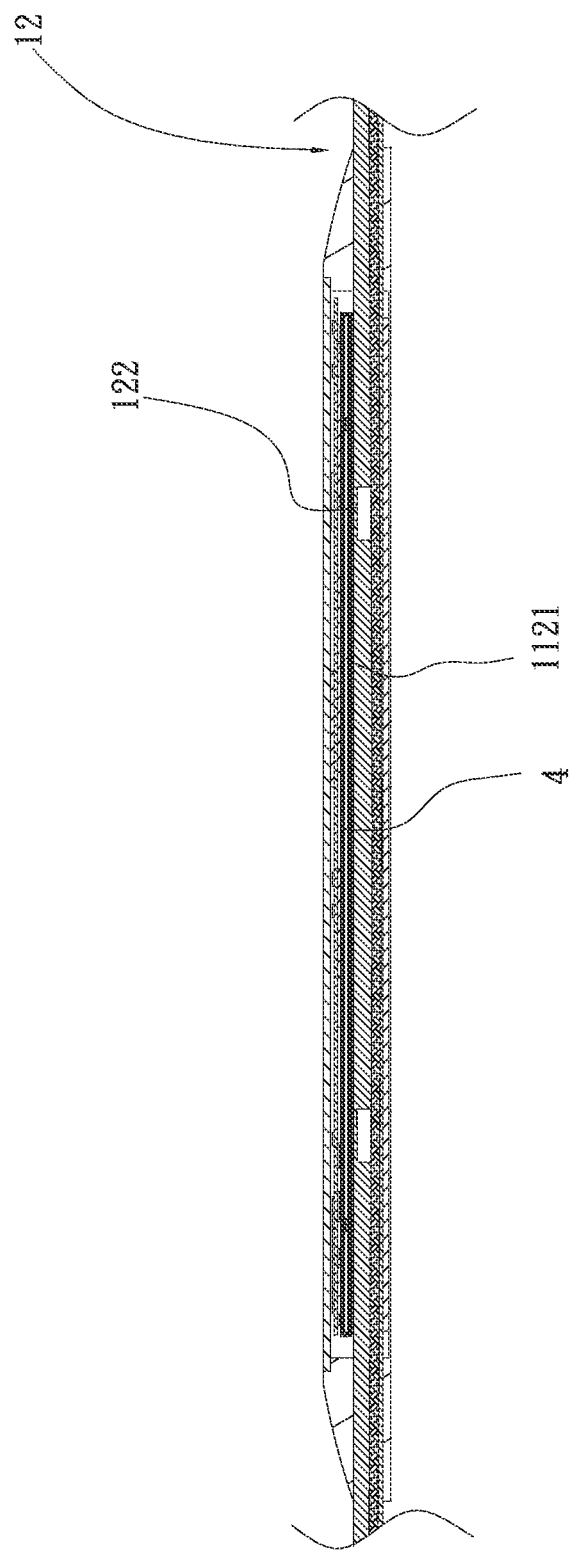
FIG. 8 is an assembled cross-sectional view of the heat dissipation structure for a wearable mobile device according to the fourth embodiment of the present invention.

Please refer to FIG. 8, which is an assembled cross-sectional view of the heat dissipation structure for a wearable mobile device according to the fourth embodiment of the present invention. As shown in FIG. 8, some structural and technical features of the current embodiment are the same as those of the first embodiment and will not be described here again. The difference is that the current embodiment further comprises at least one heat transfer unit 4 which is selected to be one of a heat pipe, a vapor chamber, and a graphite sheet. The heat transfer unit 4 is disposed between the electronic components 112 and the flexible belt 12. The heat of the electronic components 112 can be absorbed through the large surface of the heat transfer unit 4 and then is conducted to the heat absorbing portion 122 of the flexible belt 12. The received heat in the heat absorbing portion 122 in then conducted to the heat dissipating portion 124 in the distance for heat dissipation (as shown in FIG. 5).

Figure 9:
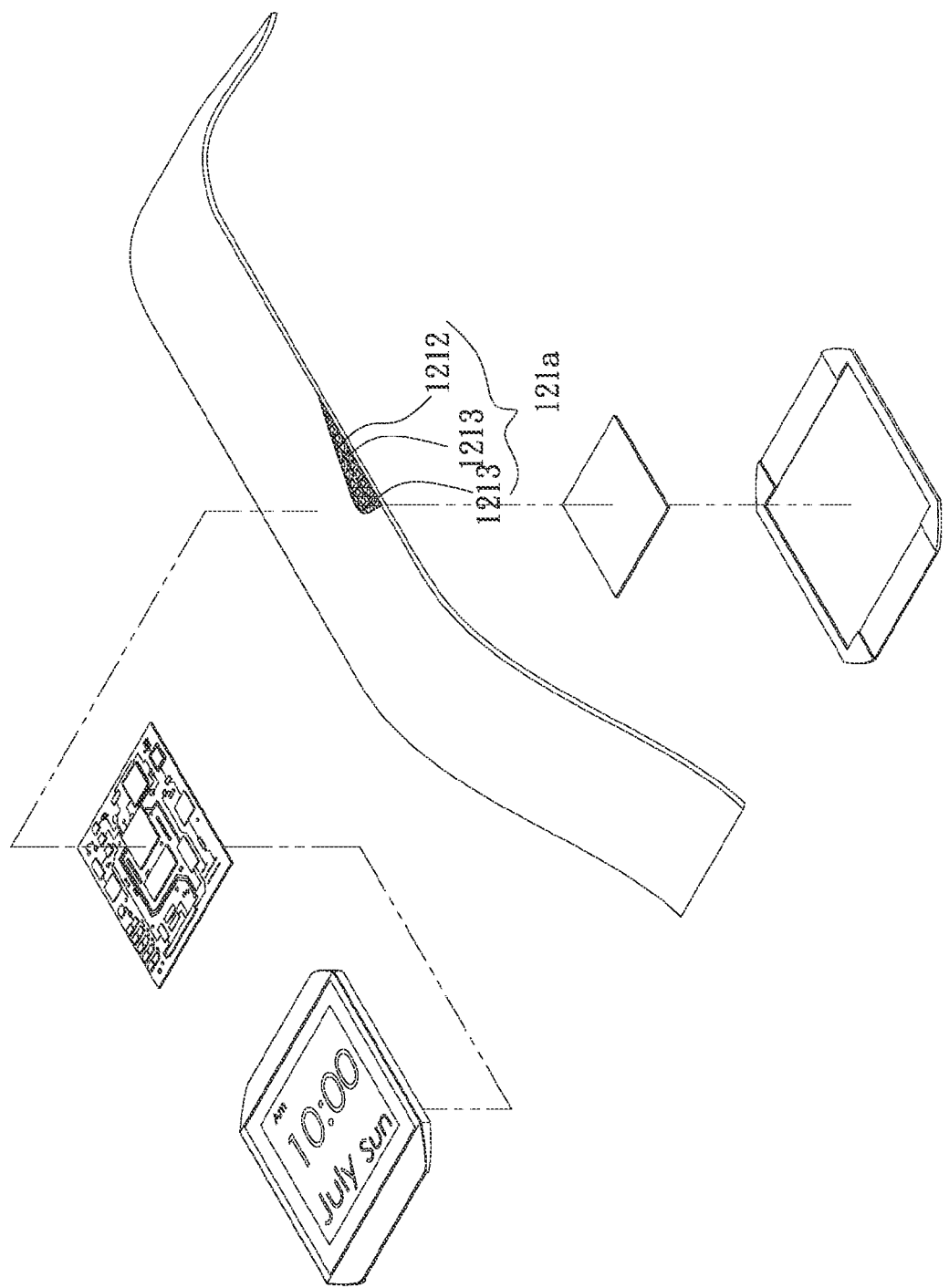
FIG. 9 is a perspective exploded view of the heat dissipation structure for a wearable mobile device according to the fifth embodiment of the present invention.

Please refer to FIG. 9, which is a perspective exploded view of the heat dissipation structure for a wearable mobile device according to the fifth embodiment of the present invention. As shown in FIG. 9, some structural and technical features of the current embodiment are the same as those of the first embodiment and will not be described here again. The difference is that the supporting portion 121a of the current embodiment has a plurality of protrusions 1213. The protrusions 1213 are spaced to each other. At least one channel 1212 is disposed transverse to or longitudinal to the protrusions 1213. The channel 1212 is used as a vapor channel after the working liquid 2 (refer to FIG. 5) is vaporized.

The working liquid 2 in the previous embodiments is selected to be one of mesh, fiber, metal wire braid, and sintered powder. The mesh is used as an example in the current embodiment, but not limited to this.

What is claimed is:

1. A heat dissipation structure for a wearable mobile device, comprising:
   a wearable mobile device having a receiving space which receives a plurality of electronic components, wherein the electronic components have at least one heat source; and
   a flexible belt made of rubber or silicone, wherein the flexible belt has a cavity which is filled with a working liquid and protrudes to form a supporting portion, wherein a wall of the cavity has at least one wick structure, wherein the flexible belt defines a heat absorbing portion and at least one heat dissipating portion, wherein two ends of the heat absorbing portion form the heat dissipating portion, wherein the heat absorbing portion contacts the electronic components or the heat source to conduct heat.

2. The heat dissipation structure according to claim 1, wherein the wick structure is selected to be one of mesh, fiber, metal wire braid, and sintered powder.

3. The heat dissipation structure according to claim 1, wherein the electronic components are selected to be one of PCBs, transistors, CPUs, MCUs, GPUs, RAMs, displays, touch panels, and batteries.

4. The heat dissipation structure according to claim 1, wherein the wall of the cavity has a coating layer.

5. The heat dissipation structure according to claim 1, wherein a heat conductor is embedded in the heat absorbing portion, wherein one side of the heat conductor is attached to the electronic components or the heat source, wherein the other side of the heat conductor corresponds to the cavity of the flexible belt, wherein the wick structure is disposed around the heat conductor.

6. The heat dissipation structure according to claim 1, wherein the heat absorbing portion of the flexible belt is thinner than the other portion of the flexible belt, wherein part of the heat absorbing portion contacts the heat transfer unit.

7. The heat dissipation structure according to claim 1, further comprising at least one heat transfer unit which is selected to be one of a heat pipe, a vapor chamber, and a graphite sheet, wherein the heat transfer unit is disposed between the electronic components and the flexible belt.

8. The heat dissipation structure according to claim 1, wherein the supporting portion has a plurality of ribs which are disposed in parallel, wherein at least one channel is disposed among the ribs.

9. The heat dissipation structure according to claim 1, wherein the supporting portion has a plurality of protrusions which are spaced to each other, wherein at least one channel is disposed transverse to or longitudinal to the protrusions.

* * * * *